(12) United States Patent
Cho et al.

(10) Patent No.: US 12,391,584 B2
(45) Date of Patent: Aug. 19, 2025

(54) OZONE GENERATING ELECTRODE, METHOD OF MANUFACTURING SAME, AND METHOD OF PRODUCING OZONE USING SAME

(71) Applicant: POSTECH Research and Business Development Foundation, Pohang-si (KR)

(72) Inventors: Kangwoo Cho, Pohang-si (KR); Seok Kim, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 467 days.

(21) Appl. No.: 17/834,213

(22) Filed: Jun. 7, 2022

(65) Prior Publication Data

US 2023/0104287 A1    Apr. 6, 2023

(30) Foreign Application Priority Data

Oct. 5, 2021 (KR) .......................... 10-2021-0131723

(51) Int. Cl.
  *C02F 1/461*    (2023.01)
  *C01B 13/11*    (2006.01)
  (Continued)

(52) U.S. Cl.
  CPC ........ *C02F 1/46109* (2013.01); *C01B 13/115* (2013.01); *C02F 1/4672* (2013.01);
  (Continued)

(58) Field of Classification Search
  CPC ................ C02F 1/46109; C02F 1/4672; C02F 2001/46142; C02F 2001/46147; C02F 2001/46138; C02F 2001/46152; C02F 2001/46157; C02F 2001/46185; C02F 1/4272; C02F 1/32; C02F 1/46; C02F 1/42; C02F 1/72; C01B 13/11; C01B 13/115
  See application file for complete search history.

(56) References Cited

U.S. PATENT DOCUMENTS

2020/0407248 A1* 12/2020 Yang .................. C02F 1/46109

FOREIGN PATENT DOCUMENTS

KR    20210047108 A  * 10/2019  ............... C02F 1/46
WO    WO-2017011506 A1 *  1/2017  ............. C01B 13/11

OTHER PUBLICATIONS

KR-20210047108-A-Translation (Year: 2021).*

* cited by examiner

*Primary Examiner* — Lessanework Seifu
(74) *Attorney, Agent, or Firm* — LEX IP MEISTER, PLLC

(57) ABSTRACT

Proposed are an ozone generating electrode, a method of manufacturing the same, and a method of producing ozone using the same. The ozone generating electrode includes a support including a metal, a catalyst layer positioned on one surface or both surfaces of the support, and a coating layer positioned on the catalyst layer and including a metal oxide. The ozone generating electrode is energy efficient, stable, and provides a high concentration of ozone to a water system. In addition, when water treatment is performed with the ozone generating electrode of the present invention, it is possible to more effectively decompose pollutants during water treatment and to reduce the electrode replacement cycle, thereby reducing water treatment operation time and cost.

12 Claims, 4 Drawing Sheets

(51) Int. Cl.
*C02F 1/467* (2023.01)
*C02F 101/30* (2006.01)
(52) U.S. Cl.
CPC ...... *C01B 2201/22* (2013.01); *C01B 2201/24* (2013.01); *C02F 2001/46142* (2013.01); *C02F 2001/46147* (2013.01); *C02F 2001/46157* (2013.01); *C02F 2101/30* (2013.01)

OZONE GENERATING ELECTRODE, METHOD OF MANUFACTURING SAME, AND METHOD OF PRODUCING OZONE USING SAME

CROSS REFERENCE TO RELATED APPLICATION

The present application claims priority to Korean Patent Application No. 10-2021-0131723, filed Oct. 5, 2021, the entire contents of which is incorporated herein for all purposes by this reference.

BACKGROUND OF THE INVENTION

1. Field of the Invention

The present invention relates to an ozone generating electrode, a method of manufacturing the same, and a method for producing ozone using the same. More particularly, the present invention relates to an electrode capable of effectively generating ozone through an electrochemical water oxidation reaction in water, a method of manufacturing the same, and a method of producing ozone using the same.

2. Description of the Related Art

As the environmental pollution of the water system becomes increasingly serious and the effluent of non-biodegradable wastewater that is not easily decomposed by existing biological treatment technologies increases, an advanced water treatment technology is required. Among them, the water treatment technology using ozone is environmentally friendly, has strong oxidizing power, and produces fewer disinfectant by-products compared to chlorine treatment, so it has been a spotlighted water treatment technology. In addition, ozone is a substance widely used in various applications such as surface treatment, deodorization, bleaching, and disinfection in the industry.

Conventional ozone generation technology uses cold corona discharge (CCD) in which oxygen gas is electrically charged to produce ozone in a gaseous form. However, since CCD ozone production requires a strong voltage, requires a complex facility using dry oxygen gas, and has limitations in increasing the ozone concentration in water, the technology is not suitable for use in water treatment.

Accordingly, electrochemical ozone production (EOP), which produces ozone through electrolysis in a water system, has attracted attention as an ozone production technology replacing the CCD technology. The EOP technology produces ozone by oxidizing water ($H_2O$) represented by Equation 1.

$$3H_2O \rightarrow O_3 + 6H^+ + 6e^-$$ [Equation 1]

The EOP technology requires relatively low energy level compared to the CCD technology, does not require raw materials other than water, and increases ozone concentration in water. However, the existing EOP oxidation electrode has low ozone production efficiency and poor stability. Therefore, it is difficult to use the existing EOP oxidation electrode in practice.

Therefore, there is a need for research on an EOP oxidation electrode having high ozone production efficiency and excellent stability and a method of manufacturing the same.

BACKGROUND OF THE DISCLOSURE

An objective of the present invention is to provide an oxidation electrode having high ozone production efficiency and stability and a method of manufacturing the same electrode.

Another objective of the present invention is to provide an ozone production method with high efficiency by using the oxidation electrode.

According to one aspect of the present invention, there is provided an ozone generating electrode including: a support containing a metal; a catalyst layer positioned on the entire or partial surface of the support; and a coating layer disposed on the catalyst layer and containing a metal oxide.

In addition, the catalyst layer and the coating layer may form a heterojunction therebetween.

In addition, the metal oxide may contain at least one selected from the group consisting of silicon oxide, titanium oxide, tantalum oxide, bismuth oxide, tellurium oxide, antimony oxide, strontium oxide, and gadolinium oxide.

In addition, the catalyst layer may contain at least one selected from the group consisting of tin oxide, lead oxide, and diamond.

In addition, the catalyst layer may contain tin oxide, and the tin oxide may be doped with a dopant including at least one selected from the group consisting of nickel (Ni) and antimony (Sb).

In addition, the catalyst layer may contain diamond, and the diamond may be doped with a dopant including boron (B).

In addition, the metal of the support may include at least one selected from the group consisting of titanium, niobium, nickel, and silicon.

In addition, the support may have any one shape selected from the group consisting of a flat plate, a mesh, and a honeycomb.

In addition, the catalyst layer may be positioned on at least one surface of a first surface of the support and a second surface opposite to the first surface.

According to another aspect of the present invention, there is provided a the method of manufacturing ozone generating electrode, the method including: (a) surface-treating a support comprising a metal; (b) applying and thermally treating a catalyst precursor solution to form a catalyst layer in the entire or partial area of the surface of the surface-treated support; and (c) applying and thermally threating a coating precursor solution to form a coating layer on the catalyst layer, thereby producing an ozone generating electrode.

In addition, the catalyst precursor solution may contain a tin oxide precursor.

In addition, the catalyst precursor solution may further contain a dopant precursor.

In addition, the coating precursor solution may contain a metal oxide precursor.

In addition, the heat treatment of step (b) and step (c) may be performed at a temperature in the range of 400° C. to 600° C.

In addition, the method of manufacturing the ozone generating electrode further includes (d) thermally treating the ozone generating electrode to create a concentration gradient of metal ions on a junction between the catalyst layer and the coating layer, after performing step (c).

In addition, the thermal treatment of step (D) may be performed at a temperature in the range of 400° C. to 600° C.

According to a further aspect of the present invention, there is provided a method of producing ozone, the method including: (1) immersing the ozone generating electrode in an aqueous solution containing water; and (2) applying an electric current to the ozone generating electrode so that the water is oxidized around the ozone generating electrode, resulting in generation of ozone ($O_3$), electrons ($e^-$), and hydrogen ions ($H^+$).

In addition, step (2) may be a process (2-1) in which the ozone generating electrode, the counter electrode, and the reference electrode are put in the aqueous solution and a constant current is applied to the ozone generating electrode and the counter electrode so that the water around the ozone generating electrode is oxidized, thereby generating ozone ($O_3$), electrons ($e^-$), and hydrogen ions ($H^+$).

According to a yet further aspect of the present invention, there is provided a method of decomposing an organic compound, the method including: (1') immersing the ozone generating electrode in an aqueous solution containing water and an organic compound; (2') applying an electric current to the ozone generating electrode so that the water around the ozone generating electrode is oxidized, resulting in generation of ozone ($O_3$), electrons ($e^-$), and hydrogen ions ($H^+$); and (3') decomposing the organic compound by the ozone.

The ozone generating electrode of the present invention can be obtained by simply modifying the existing ozone catalyst layer, and thus obtained ozone generating electrode has ozone production efficiency several times higher than the existing electrode and has increased stability. That is, the ozone generating electrode of the present invention can stably supply high-concentration ozone in water.

In addition, with the use of the ozone generating electrode of the present invention, it is possible to more effectively decompose contaminants during water treatment and to reduce the electrode replacement cycle, thereby reducing water treatment operation time and cost.

BRIEF DESCRIPTION OF THE DRAWINGS

Since the accompanying drawings are for reference in describing exemplary embodiments of the present invention, the technical spirit of the present invention should not be construed as being limited to the accompanying drawings.

DESCRIPTION OF THE PREFERRED EMBODIMENTS

Herein after, examples of the present invention will be described in detail with reference to the accompanying drawings in such a manner that the ordinarily skilled in the art can easily implement the present invention.

The description given below is not intended to limit the present invention to specific embodiments. In relation to describing the present invention, when the detailed description of the relevant known technology is determined to unnecessarily obscure the gist of the present invention, the detailed description may be omitted.

The terminology used herein is for the purpose of describing particular embodiments only and is not intended to limit the scope of the present invention. As used herein, the singular forms "a", "an", and "the" are intended to include the plural forms as well unless the context clearly indicates otherwise. It will be further understood that the terms "comprise" or "have" when used in this specification specify the presence of stated features, integers, steps, operations, elements and/or combinations thereof, but do not preclude the presence or addition of one or more other features, integers, steps, operations, elements, and/or combinations thereof.

Terms including ordinal numbers used in the specification, "first", "second", etc. can be used to discriminate one component from another component, but the order or priority of the components is not limited by the terms unless specifically stated. These terms are used only for the purpose of distinguishing a component from another component. For example, without departing from the scope of the present invention, a first component may be referred as a second component, and a second component may be also referred to as a first component.

In addition, when it is mentioned that a component is "famed" or "stacked" on another component, it should be understood such that one component may be directly attached to or directly stacked on the front surface or one surface of the other component, or an additional component may be disposed between them.

Hereinafter, an ozone generating electrode, a method of manufacturing the ozone generating electrode, and a method of producing ozone with the use of the ozone generating electrode, according to the present invention, will be described in detail. However, those are described as examples, and the present invention is not limited thereto and is only defined by the scope of the appended claims.

Figure 1:
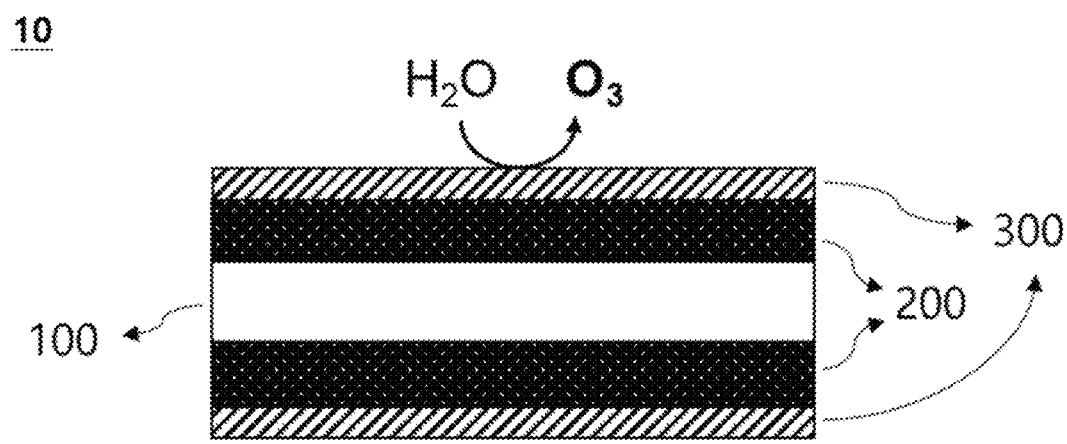
FIG. 1 is a schematic diagram illustrating an ozone generating electrode according to one embodiment of the present invention and a method of producing zone using the ozone generating electrode.

FIG. 1 is a schematic diagram illustrating an ozone generating electrode according to one embodiment of the present invention and a method of producing zone using the ozone generating electrode.

Referring to FIG. 1, the present invention provides an ozone generating electrode (10) including: a support (100) containing a metal; a catalyst layer (200) positioned on the entire or partial area of the surface of the support (100); and a coating layer (300) disposed on the catalyst layer (200) and containing a metal oxide.

In addition, the catalyst layer and the coating layer may form a heterojunction therebetween.

In addition, the metal oxide may include at least one selected from the group consisting of silicon oxide, titanium oxide, tantalum oxide, bismuth oxide, tellurium oxide, antimony oxide, strontium oxide, and gadolinium oxide. Preferably, the metal oxide may include at least one selected from the group consisting of silicon oxide, titanium oxide, tantalum oxide, strontium oxide, and gadolinium oxide. The metal oxide may more preferably include at least one selected from the group consisting of silicon oxide, titanium oxide, and tantalum oxide. Even more preferably, the metal oxide may include silicon oxide.

In addition, the catalyst layer may contain at least one selected from the group consisting of tin oxide, lead oxide, and diamond.

In addition, the catalyst layer may contain tin oxide, and the tin oxide may be doped with a dopant including at least one selected from the group consisting of nickel (Ni) and antimony (Sb).

In addition, the catalyst layer may contain diamond, and the diamond may be doped with a dopant including boron (B).

In addition, the metal of the support may include at least one selected from the group consisting of titanium, niobium, nickel, and silicon. Preferably, it may include titanium.

In addition, the support may have any one shape selected from the group consisting of a flat plate, a mesh, and a honeycomb.

In addition, the catalyst layer may be positioned on at least one surface of a first surface of the support and a second surface opposite to the first surface.

The present invention provides a method of manufacturing an ozone generating electrode. The method includes: (a) surface-treating a support including a metal; (b) applying a catalyst precursor solution and thermally treating the applied catalyst precursor solution to form a catalyst layer in the entire or partial area of the surface of the support; and (c) applying a coating precursor solution and thermally treating the applied precursor solution to form a coating layer on the catalyst layer, thereby producing an ozone generating electrode.

In addition, the catalyst precursor solution may include a tin oxide precursor, and the tin oxide precursor may include at least one selected from the group consisting of tin nitrate, tin chloride, tin hydroxide, and tin sulfate. Preferably, the tin oxide precursor may include tin chloride ($SnCl_4$).

In addition, the catalyst precursor solution may further include a dopant precursor, and the dopant precursor may include at least one selected from the group consisting of a nickel precursor and an antimony precursor.

The nickel precursor may include at least one selected from the group consisting of nickel oxynitride, nickel chloride, nickel hydroxide, and nickel sulfate. Preferably, the nickel precursor may include nickel chloride ($NiCl_2$).

The antimony precursor may include at least one selected from the group consisting of antimony oxynitride, antimony chloride, antimony hydroxide, and antimony sulfate. Preferably, the nickel precursor may include antimony chloride ($SbCl_3$).

In addition, the coating precursor solution may include a metal oxide precursor. The metal oxide precursor may include at least one selected from the group consisting of a silicon oxide precursor, a titanium oxide precursor, a tantalum oxide precursor, a bismuth oxide precursor, a tellurium oxide precursor, an antimony oxide precursor, a strontium oxide precursor, and a gadolinium oxide precursor. Preferably, the metal oxide precursor may include at least one selected from the group consisting of a silicon oxide precursor, a titanium oxide precursor, a tantalum oxide precursor, a strontium oxide precursor, and a gadolinium oxide precursor. More preferably, the metal oxide precursor may include at least one selected from the group consisting of a silicon oxide precursor, a titanium oxide precursor, and a tantalum oxide precursor. Most preferably, the metal oxide precursor may include silicon oxide.

The silicon oxide precursor may include at least one selected from the group consisting of silicon oxynitride, silicon chloride, silicon hydroxide, silicon sulfate, and an organic silicon compound. Preferably, the silicon oxide precursor includes an organic silicon compound.

The titanium oxide precursor may include at least one selected from the group consisting of titanium oxynitride, titanium chloride, titanium hydroxide, titanium sulfate, and an organic titanium compound. Preferably, the titanium oxide precursor includes an organic titanium compound.

The tantalum oxide precursor may include at least one selected from the group consisting of tantalum nitrate, tantalum chloride, tantalum hydroxide, tantalum sulfur oxide, and an organic tantalum compound. Preferably, the tantalum oxide precursor includes tantalum chloride.

The strontium oxide precursor may include at least one selected from the group consisting of strontium nitrate, strontium chloride, strontium hydroxide, strontium sulfate, and an organic strontium compound. Preferably, the strontium oxide precursor includes an organic strontium compound.

The gadolinium oxide precursor may include at least one selected from the group consisting of gadolinium nitrate, gadolinium chloride, gadolinium hydroxide, gadolinium sulfate, and an organic gadolinium compound. The gadolinium oxide precursor may preferably include gadolinium nitrate.

In addition, the thermal treatment of step (b) and the thermal treatment of step (c) may be performed at a temperature in the range of 400° C. to 600° C. Preferably, the thermal treatments may be performed at 500° C. When the thermal treatment is performed at a temperature lower than 400° C., it is not preferable because the tin oxide precursor in the catalyst precursor solution or the metal oxide precursor in the coating precursor solution cannot sufficiently combine with oxygen ions to form the catalyst layer or the coating layer. When the thermal treatment is performed at a temperature higher than 600° C., it is not desirable because the metal oxide precursor and the support are peroxidized.

In addition, the method of manufacturing the ozone generating electrode further includes (d) thermally treating the ozone generating electrode to create a concentration gradient of metal ions in a junction between the catalyst layer and the coating layer, in which step (d) is performed after step (c). Specifically, through the thermal treatment, solid diffusion of metal ions occurs at the junction between the catalyst layer and the coating layer. Thus, the catalyst material and the coating material coexist in the junction, resulting in a concentration gradient. This lowers electrical resistance at the junction to facilitate the transfer of electrical energy and changes the properties of the catalyst to improve the efficiency of the electrochemical reaction.

In addition, the thermal treatment of step (d) may be performed at a temperature in the range of 400° C. to 600° C. Preferably, the thermal treatment may be performed at 500° C. When the thermal treatment is performed at a temperature lower than 400° C., it is not desirable because solid diffusion of metal ions does not occur at the junction between the catalyst layer and the coating layer, preventing a concentration gradient of metal ions from being famed. On the other hand, when the temperature of the thermal treatment exceeds 600° C., it is not desirable because the metal oxide precursor and the support are peroxidized.

The present invention provides a method of producing ozone, the method including: (1) immersing the ozone generating electrode in an aqueous solution containing water; and (2) applying an electric current to the ozone generating electrode so that the water is oxidized around the ozone generating electrode, resulting in generation of ozone ($O_3$), electrons ($e^-$), and hydrogen ions ($H^+$).

In addition, step (2) may be a process (2-1) in which the ozone generating electrode, the counter electrode, and the reference electrode are put in the aqueous solution and a constant current is applied to the ozone generating electrode and the counter electrode so that the water around the ozone generating electrode is oxidized, resulting in generation of ozone ($O_3$), electrons ($e^-$), and hydrogen ions ($H^+$).

The present invention provides a method of decomposing an organic compound, the method including: (1') immersing the ozone generating electrode in an aqueous solution containing water and an organic compound; (2') applying an electric current to the ozone generating electrode so that the water around the ozone generating electrode is oxidized, resulting in generation of ozone ($O_3$), electrons ($e^-$), and hydrogen ions ($H^+$); and (3') decomposing the organic compound by the ozone.

The organic compound may include at least one selected from the group consisting of phenol, bisphenol A, catechol, 4-chlorophenol, 2-chlorophenol, 2,3-chlorophenol, 2,4-chlorophenol, 2,4,6-trichlorophenol, pentachloro benzene, 4-chloroaniline, 4-nitrophenol, acetaminophen, carbamazepine, rhodamine B, acid orange 7, benzoic acid, 2,4-dichlorophenoxyacetic acid, methylene blue, dichloroacetic acid, As(III), formic acid, and oxalic acid.

EXAMPLE

Hereinafter, a preferred example of the present invention will be described. However, the example is for illustrative purposes, and the scope of the present invention is not limited thereto.

Manufacture of Ozone Generating Electrode

Example 1: NSS/$SiO_x$ Ozone Generating Electrode

A Ti support in the form of a flat plate having a size of 2 cm×2 cm (width×length) and a thickness of 0.125 mm was prepared. One side of the support was polished using sandpaper until the surface of the support lost its gloss, and sonicated in an acetone solution diluted with distilled water in a ratio of 1:1 for 10 minutes. Then, the support is etched in a 10 wt % oxalic acid solution at about 80° C. for 1 hour. Thereafter, the Ti support was surface-treated through sonication in distilled water for 10 minutes and washed.

To form the catalyst layer of Ni—Sb—$SnO_2$ (NSS), a $NiCl_2$:$SbCl_3$:$SnCl_4$ precursor solution was dissolved in ethanol at a molar ratio of 1:6:100 so that the total metal ion concentration became 1 M, and then the precursor solution is applied on one surface of the surface-treated Ti support through spin coating. The Ti support was dried at about 80° C. for about 10 minutes, followed by thermal treatment at about 500° C. for about 10 minutes. After the application of the precursor solution and the thermal treatment were performed a total of 10 times, a final thermal treatment was performed at about 500° C. for about 1 hour to form a catalyst layer on the surface-treated Ti support.

Tetraethyl orthosilicate ($Si(OC_2H_5)_4$) was added to ethanol to become a concentration of 0.25 M, and a small amount of hydrochloric acid and water were added for stability of the solution, thereby preparing a Si precursor solution as a coating precursor solution.

The coating precursor solution was applied on the catalyst layer through spin coating, dried at about 80° C. for 10 minutes, and thermally treated at about 500° C. for about 10 minutes. After the application of the solution and the thermal treatment were performed 2 times, a final thermal treatment was performed at about 500° C. for about 1 hour. Thus, an NSS/$SiO_x$ ozone generating electrode was manufactured.

Example 2: NSS/$TiO_x$ Ozone Generating Electrode

An NSS/$TiO_x$ ozone generating electrode was manufactured in the same manner as in Example 1, except that a Ti precursor solution was used instead of the Si precursor solution as the coating precursor solution.

In this case, the Ti precursor solution was prepared by mixing titanium butoxide ($Ti(OBu)_4$) and glycolic acid in a molar ratio of 1:1.5, adding a small amount of water to the mixture to form precipitate, dissolving the precipitate with a concentrated hydrogen peroxide solution, and adding a small amount of $NH_4OH$ so that the pH was adjusted to a neutral condition the final Ti ion concentration became about 0.25 M.

Example 3: NSS/$TaO_x$ Ozone Generating Electrode

An NSS/$TaO_x$ ozone generating electrode was manufactured in the same manner as in Example 1, except that a Ta precursor solution was used instead of the Si precursor solution as the coating precursor solution.

In this case, as the Ta precursor solution was prepared by adding ethanol to $TaCl_5$ so that the concentration of $TaCl_5$ was adjusted to 0.25 M.

Example 4: Mesh-Shaped NSS/$SiO_x$ Ozone Generating Electrode

A mesh-shaped NSS/$SiO_x$ ozone generating electrode was manufactured in the same manner as in Example 1 except that a mesh-shaped Ti support with a size of 1 cm×2 cm (width×length) was used and a dip coating process was used for formation of the catalyst layer and the coating layer instead that the flat Ti support with a size of 2 cm×2 cm (width×length) and a thickness of 0.125 mm was used and the spin coating was used for the formation of the catalyst layer and the coating layer in Example 1.

Examples 5 to 8: Mesh-Shaped NSS/$SiO_x$ Ozone Generating Electrodes with Different Thicknesses of Coating Layers A mesh-shaped NSS/$SiO_x$ ozone generating electrode was prepared under the same conditions as in Example 4, but the number of times of application and thermal treatment of the coating precursor solution were changed. The manufacturing conditions are described in Table 1 below.

TABLE 1

| Classification | Number of times of coating and thermal treatment |
| --- | --- |
| Example 4 | Two times |
| Example 5 | Four times |
| Example 6 | Six times |
| Example 7 | Eight times |
| Example 8 | Ten times |

Comparative Example 1: NSS Ozone Generating Electrode

An NSS ozone generating electrode was manufactured in the same manner as in Example 1, except that a coating layer was not formed.

Comparative Example 2: Mesh-Shaped NSS Ozone Generating Electrode

An NSS ozone generating electrode was manufactured in the same manner as in Example 4, except that a coating layer was not famed.

Experimental Example

Figure 2A:
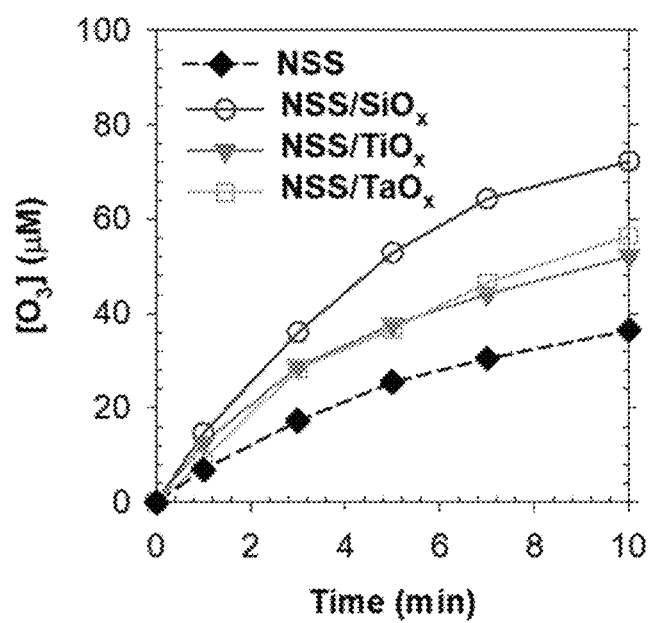
FIG. 2A shows change in ozone production amount over time in Examples 1 to 3 and Comparative Example 1.
Figure 2B:
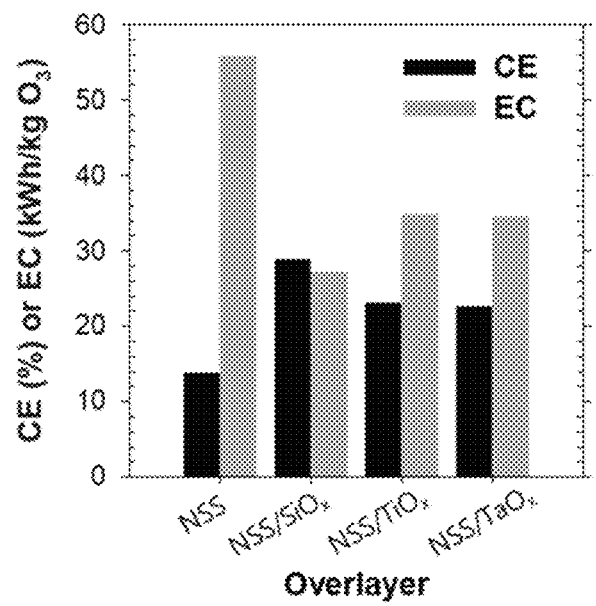
FIG. 2B is a graph showing the measurement of charge efficiency (CE) and energy consumption (EC) of Examples 1 to 3 and Comparative Example 1.

Experimental Example 1 Evaluation of Improvement in Ozone Generation Efficiency FIG. 2A shows the amount of ozone generated over time in Examples 1 to 3 and Comparative Example 1, and FIG. 2B is a graph showing the measurements of the charge efficiency (CE) and energy consumption (EC) of Examples 1 to 3 and Comparative Example 1.

Specifically, in the ozone generation test, a three-electrode system using one of the ozone generation electrodes of Examples 1 to 3 and Comparative Example 1, a Pt reduction electrode, and an Ag/AgCl reference electrode was used. The oxidation electrode and the reduction electrode were arranged in parallel with a distance of about 1 cm therebetween, and 0.5 M of $H_2SO_4$ was used as an electrolyte. The dissolved ozone concentration was measured by an indigo method using an indigo dye. In order to apply a current to an electrolysis apparatus composed of the ozone generating electrode, the reduction electrode, and the reference electrode, each of the electrodes was connected to a battery cycler (Battery Cycler, WonATech, WBCS3000), and operated at 10 mA/cm$^2$ constant current. Current efficiency (CE) and energy consumption (EC: energy consumption) were calculated using Equations 2 and 3 shown below. The calculation was based on values measured within 3 minutes after the current was applied.

$$CE\ (\%) = \frac{6 \cdot F \cdot n_{O_3}}{I \cdot t} \times 100 \quad \text{[Equation 2]}$$

$$EE\ (\text{kWh/kg } O_3) = \frac{E_{cell} \cdot I \cdot t}{3600 \cdot 48 \cdot n_{O_3}} \quad \text{[Equation 3]}$$

In Equations 2 and 3,
F is the Faraday constant (96,485 C/mol),
$n_{O3}$ is the number of moles of ozone generated,
I is an application current (A),
t is an electrolysis time (s), and
$E_{cell}$ is a cell application voltage (V).

According to FIG. 2A, compared to Comparative Example 1 (NSS) in which is a single electrode without a coating layer is used, Examples 1 to 3 (NSS/SiO$_x$, NSS/TiO$_x$, and NSS/TaO$_x$) which are ozone generating electrodes having a hetero junction structure generate a large amount of ozone.

According to FIG. 2B, Example 1 (NSS/SiO$_x$), Example 2 (NSS/TiO$_x$), and Example 3 (NSS/TaO$_x$) exhibited 2.1 times, 1.7 times, and 1.6 times higher current efficiency (CE), respectively than that of Comparative Example 1 (NSS) and 0.49 times, 0.62 times, and 0.62 times lower energy consumption (EC), respectively than Comparative Example 1 (NSS).

Accordingly, it can be seen that the ozone generating electrodes according to Examples 1 to 3 have higher current efficiency and lower energy consumption than that of Comparative Example 1 (NSS).

Experimental Example 2: Evaluation of Degree of Stability Improvement

Figure 3:
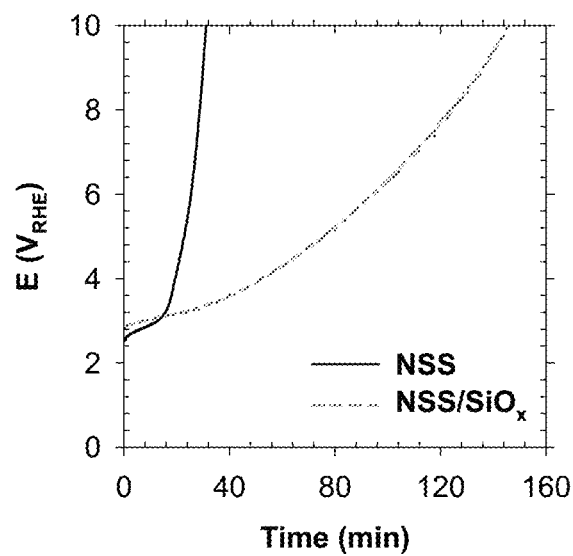
FIG. 3 shows voltage values over time in the accelerated life test of Example 1 and Comparative Example 1.

FIG. 3 shows voltage values over time in the accelerated life test of Example 1 and Comparative Example 1.

Specifically, the accelerated life test used a three-electrode system including one of the ozone generation electrodes of Examples 1 and Comparative Example 1, a Pt reduction electrode, and an Ag/AgCl reference electrode. The oxidation electrode and the reduction electrode were arranged in parallel with a distance of about 1 cm therebetween, and 0.5 M of $H_2SO_4$ was used as an electrolyte. In order to apply a current to an electrolysis apparatus composed of the ozone generating electrode, the reduction electrode, and the reference electrode, each of the electrodes was connected to a battery cycler (Battery Cycler, WonATech, WBCS3000). In the accelerated life test, a high intensity of 100 mA/cm$^2$ constant current was applied and a voltage was measured.

According to FIG. 3, it can be seen that Example 1 (NSS/SiO$_x$) exhibits about 4.7 times longer electrode lifetime (which is time taken until 10 V is measured due to electrode failure) than Comparative Example 1 (NSS).

Therefore, it can be seen that the ozone generating electrode according to Example 1 (NSS/SiO$_x$) has higher stability than Comparative Example 1 (NSS).

Experimental Example 3: Evaluation of Improvement in Organic Pollutant Decomposition Rate FIG. 4A shows the degree of decomposition of organic pollutants of Example 1 and Comparative Example 1, and FIG. 4B shows the reaction rate constant obtained by simulating a pseudo-first-order reaction to performed to determine the degree of decomposition of organic pollutants in Example 1 and Comparative Example 1.

Specifically, the organic pollutant decomposition test used a three-electrode system including one of the ozone generation electrodes of Examples 1 and Comparative Example 1, a Pt reduction electrode, and an Ag/AgCl reference electrode. The oxidation electrode and the reduction electrode were arranged in parallel with a distance of about 1 cm therebetween, and a solution containing 0.5 M of $H_2SO_4$ and 4-chlorophenol 34 µM was used as an electrolyte. In order to apply a current to an electrolysis apparatus composed of the ozone generating electrode, the reduction electrode, and the reference electrode, each of the electrodes was connected to a battery cycler (Battery Cycler, WonATech, WBCS3000), and an intensity 10 mA/cm$^2$ constant current was applied.

Figure 4A:
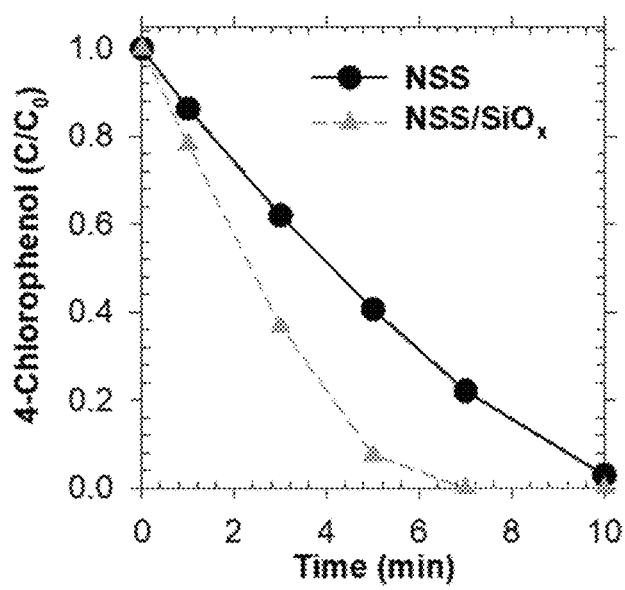
FIG. 4A shows degree of decomposition of organic pollutants of Example 1 and Comparative Example 1.

Referring to FIG. 4A, it can be seen that Example 1 (NSS/SiO$_x$) exhibits a higher organic pollutant decomposition rate than Comparative Example 1 (NSS).

Figure 4B:
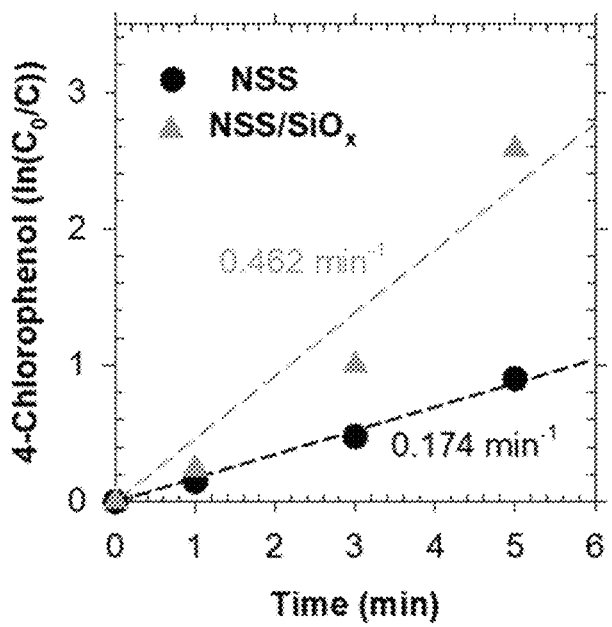
FIG. 4B shows the reaction rate constant of a pseudo-first-order reaction obtained by simulating the degree of decomposition of organic pollutants in Example 1 and Comparative Example 1.

Referring to FIG. 4B, it can be seen that Example 1 (NSS/SiO$_x$) exhibits an organic pollutant decomposition rate that is about 2.6 times faster than Comparative Example 1 (NSS).

Therefore, it can be confirmed that the ozone generating electrode according to Example 1 (NSS/SiO$_x$) has a higher organic pollutant decomposition rate and a higher decomposition speed than Comparative Example 1 (NSS).

Experimental Example 4: Evaluation of Improvement in Ozone Generation Efficiency According to Thickness of Coating Layer FIG. 5A shows ozone production efficiency in each case of Examples 4 to 8 and Comparative Example 2; and FIG. 5B shows an application voltage in Examples 4 to 8 and Comparative Example 2.

Specifically, an ozone generation experiment was performed in the same manner as in Experimental Example 1 except that each of the mesh-type ozone generating electrodes of Examples 4 to 8 and Comparative Example 2 was used as an oxidation electrode instead of each of the ozone generating electrodes of Examples 1 to 3 and Comparative Example 1.

Figure 5A:
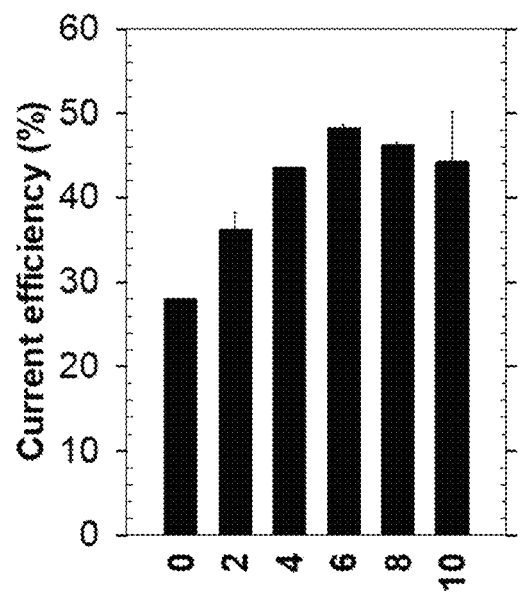
FIG. 5A shows ozone production efficiency in each case of Examples 4 to 8 and Comparative Example 2.

Referring to FIG. 5A, it can be seen that the current efficiency varies depending on the number of lamination of the coating layer (the number of times of application of the coating precursor solution and thermal treatment), and the thickness of the coating layer. As the number of times of lamination increases until reaching 6 times, the current efficiency gradually increases, showing the highest current efficiency of about 48% at the sixth time of lamination, and then decreases after the sixth time of lamination.

Figure 5B:
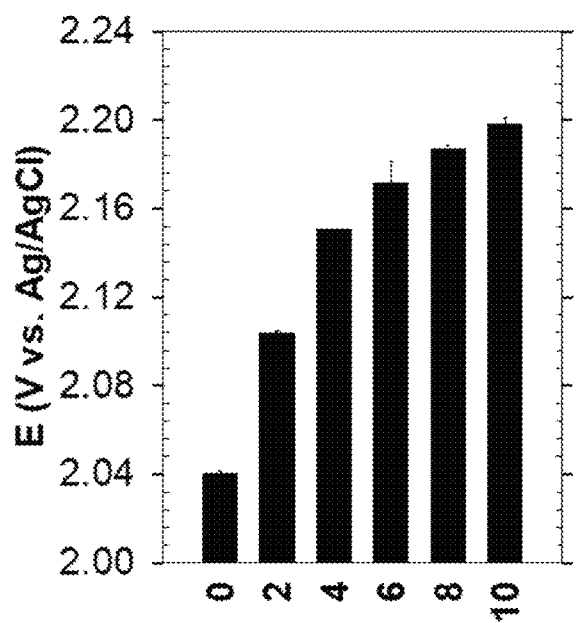
FIG. 5B shows an application voltage in Examples 4 to 8 and Comparative Example 2.

Referring to FIG. 5B, it can be seen that the applied voltage continuously increases as the number of times of lamination of the coating layer increases. It is estimated that as the thickness of $SiO_x$, which has relatively low electrical conductivity, increases, the electrical conductivity decreases.

Therefore, it can be confirmed that the ozone generating electrodes according to Examples 4 to 8 have an optimal coating layer thickness (number of laminations) and can have a current efficiency of up to about 48%.

The scope of the present invention is defined by the following claims rather than the above detailed description, and all changes or modifications derived from the meaning and scope of the claims and their equivalent concepts should be interpreted as falling into the scope of the present invention.

What is claimed is:

1. An ozone generating electrode comprising:
   a support comprising a metal;
   a catalyst layer disposed on the entire or partial surface of the support; and
   a coating layer positioned on the catalyst layer and comprising a metal oxide,
   wherein the catalyst layer comprises tin oxide; and
   wherein the metal oxide comprises at least one selected from the group consisting of silicon oxide, titanium oxide, tantalum oxide, bismuth oxide, tellurium oxide, strontium oxide, and gadolinium oxide.

2. The ozone generating electrode of claim 1, wherein the catalyst layer and the coating layer form a heterojunction therebetween.

3. The ozone generating electrode of claim 1, wherein the tin oxide is doped with a dopant comprising at least one selected from the group consisting of nickel (Ni) and antimony (Sb).

4. The ozone generating electrode of claim 1, wherein the metal of the support comprises at least one selected from the group consisting of titanium, niobium, nickel, and silicon.

5. The ozone generating electrode of claim 1, wherein the support has a shape selected from the group consisting of a flat plate shape, a mesh shape, and a honeycomb shape.

6. The ozone generating electrode of claim 1, wherein the catalyst layer is positioned on a first surface, a second surface opposing the first surface, or both of the support.

7. A method of manufacturing an ozone generating electrode, the method comprising:
   (a) treating a surface of a support comprising a metal;
   (b) applying a catalyst precursor solution on the entire or partial area of the surface of the surface-treated support and thermally treating the applied catalyst precursor solution to form a catalyst layer; and
   (c) applying a coating precursor solution on the catalyst layer and thermally treating the applied coating precursor solution to form a coating layer,
   wherein the catalyst precursor solution comprises a tin oxide precursor; and
   wherein the coating precursor solution comprises at least one selected from the group consisting of a silicon oxide precursor, a titanium oxide precursor, a tantalum oxide precursor, a bismuth oxide precursor, a tellurium oxide precursor, a strontium oxide precursor, and a gadolinium oxide precursor.

8. The method of claim 7, wherein the catalyst precursor solution further comprises a dopant precursor.

9. The method of claim 7, wherein the thermal treatment in each of step (b) and step (c) is performed at a temperature in a range of 400° C. to 600° C.

10. The method of claim 7, further comprising: (d) thermally treating the ozone generating electrode to form a concentration gradient of metal ions in a junction between the catalyst layer and the coating layer, in which step (d) is performed after step (c).

11. The method of claim 10, wherein the thermal treatment in step (d) is performed at a temperature in a range of 400° C. to 600° C.

12. A method of decomposing an organic compound, the method comprising:
   (1') immersing the ozone generating electrode of claim 1 in an aqueous solution containing water and an organic compound; and
   (2') applying a current to the ozone generating electrode so that water is oxidized around the ozone generating electrode, thereby generating ($O_3$), electrons ($e^-$), and hydrogen ions ($H^+$); and
   (3') allowing the ozone to decompose the organic compound.

* * * * *